Nov. 19, 1929.　　O. C. SCHMIDT　　1,736,550
MEAT GRINDING MACHINERY
Filed Aug. 15, 1927　　3 Sheets-Sheet 2
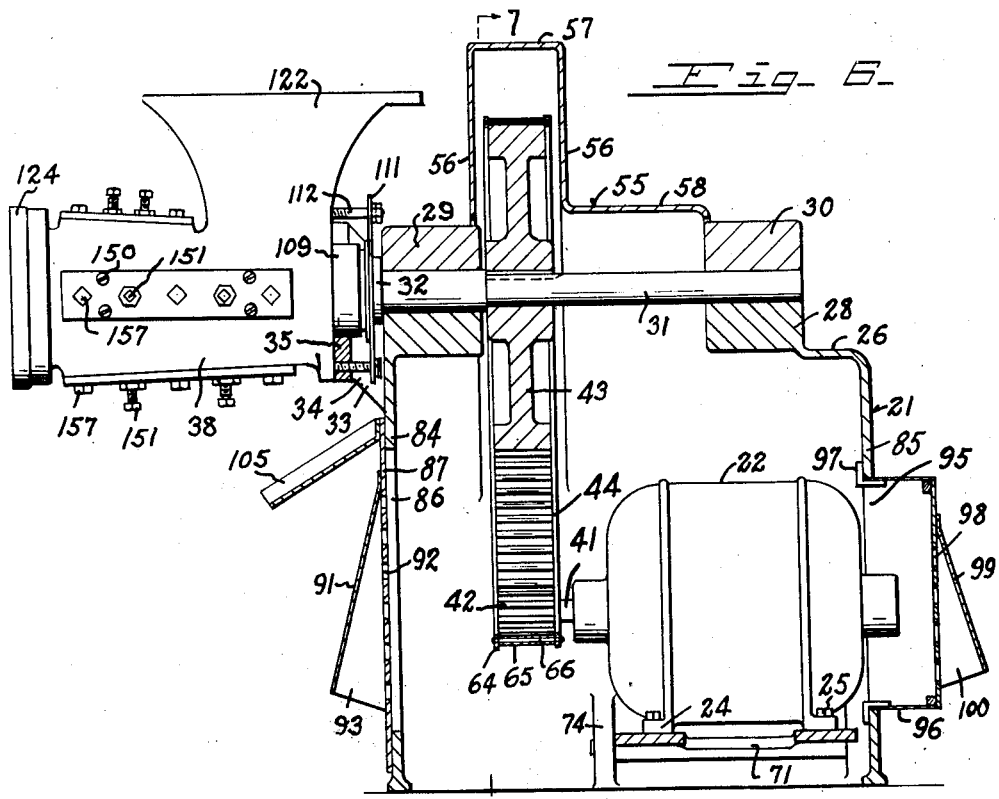
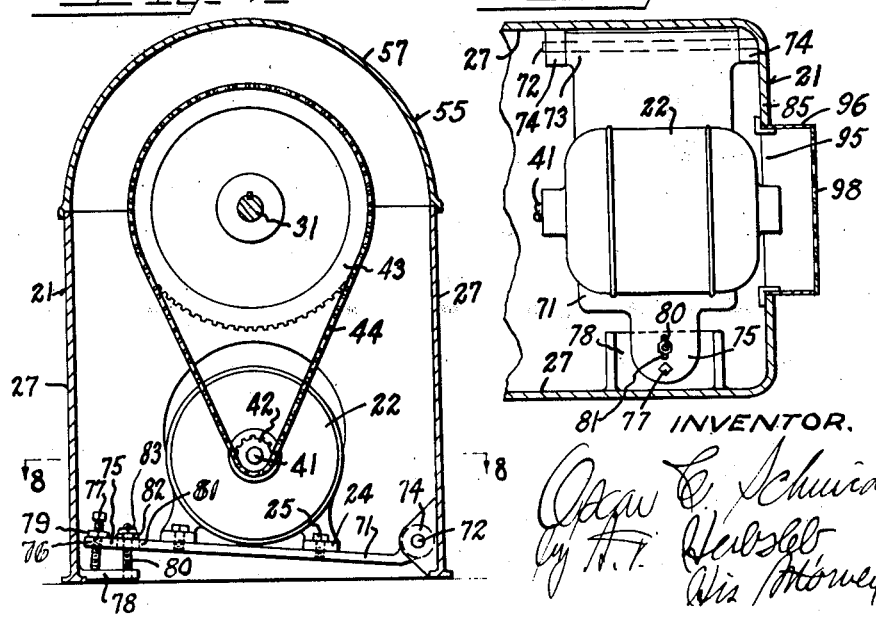
INVENTOR.

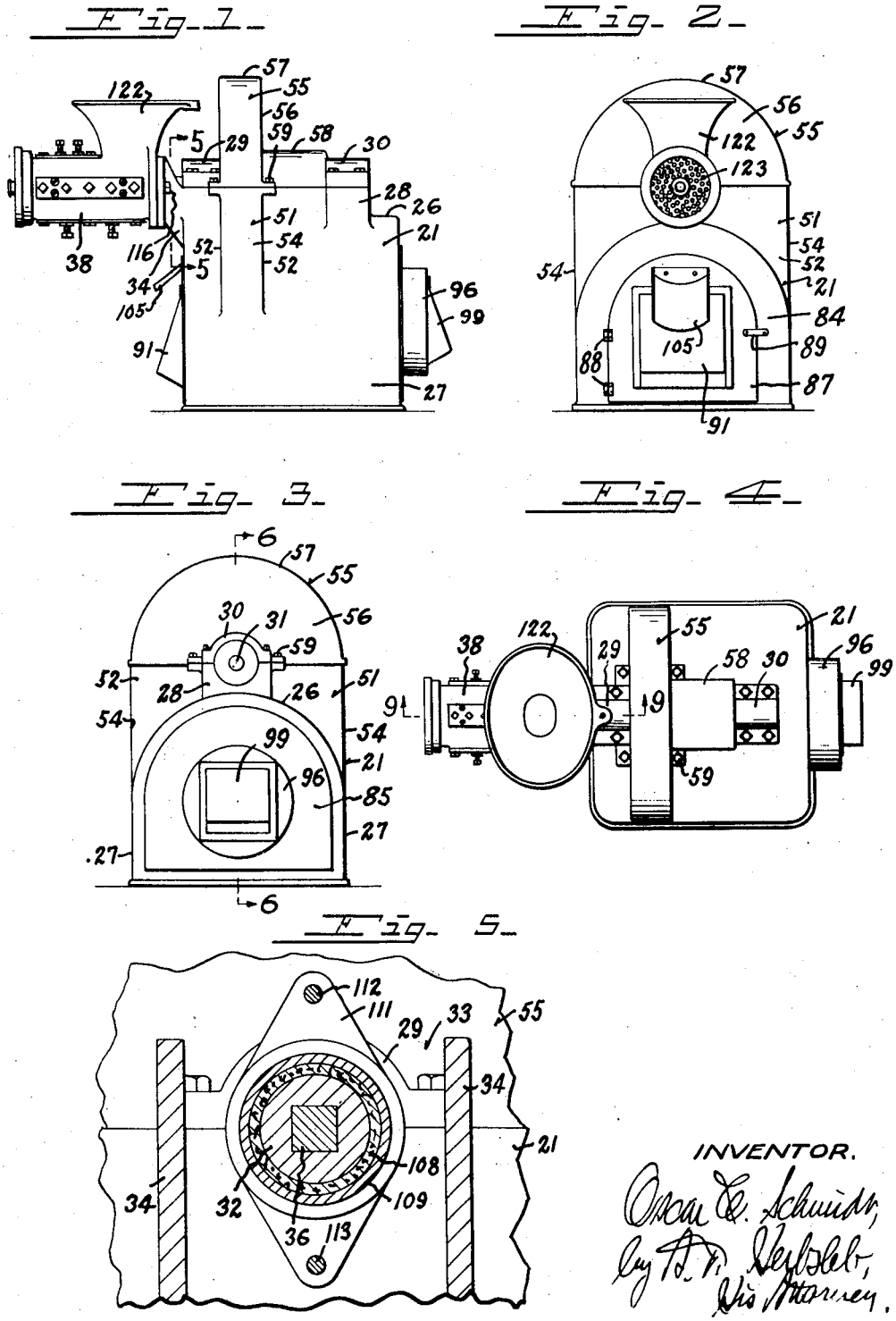

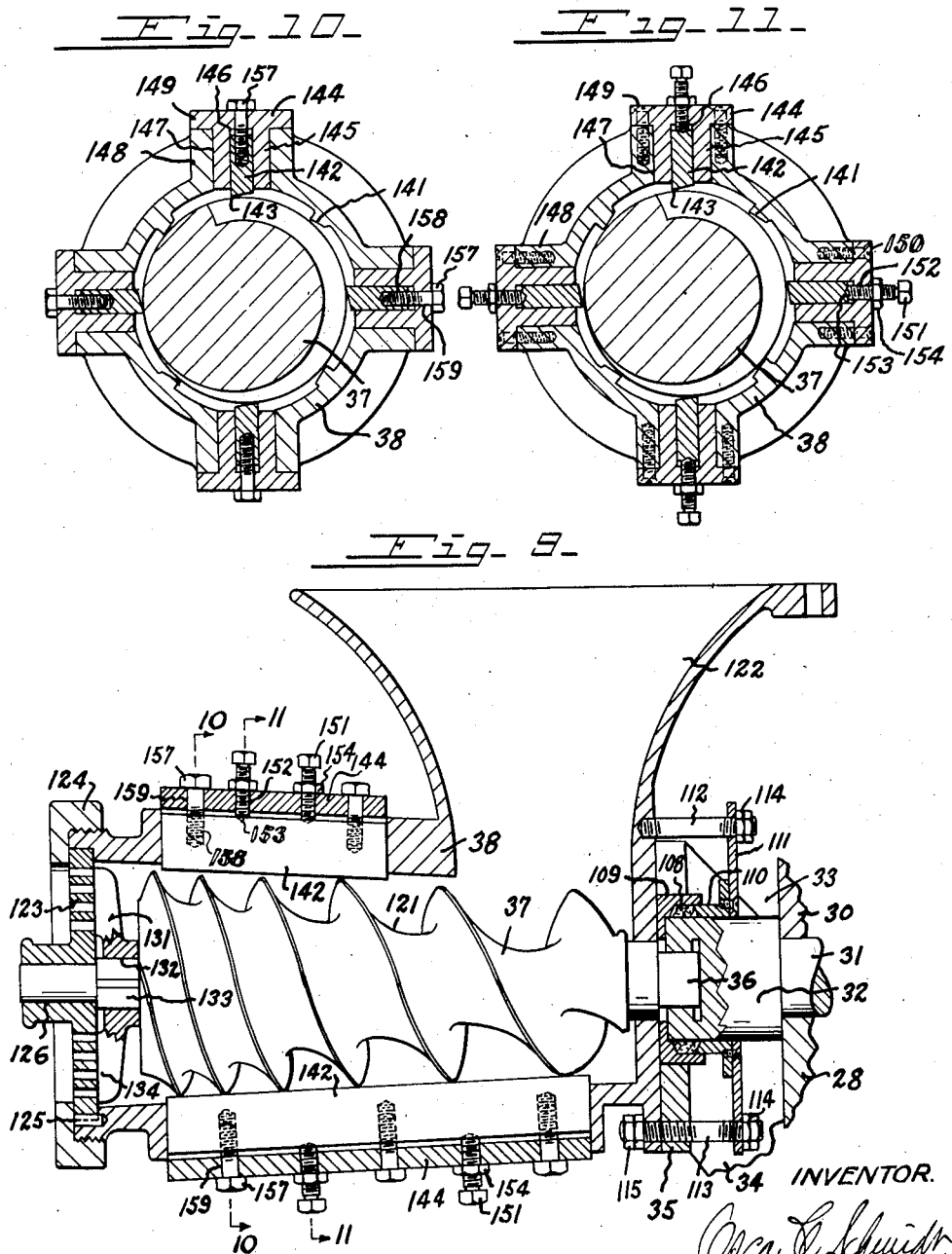

Patented Nov. 19, 1929

1,736,550

UNITED STATES PATENT OFFICE

OSCAR C. SCHMIDT, OF CINCINNATI, OHIO, ASSIGNOR TO THE CINCINNATI BUTCHERS' SUPPLY COMPANY, OF CINCINNATI, OHIO, A CORPORATION OF OHIO

MEAT-GRINDING MACHINERY

Application filed August 15, 1927. Serial No. 213,157.

It is the object of my invention to provide a compact and strong meat grinding machine which has its motive power contained therein; further, to so provide and arrange a housing containing the motive power as to occupy little space and in such manner that the housing is braced in all directions, for avoiding vibration; further, to provide novel ventilating means and protecting means for the motor and driving connections adjacent thereto; and, further, to provide a novel arrangement of casing and knife adjusting means therefor.

The invention will be further readily understood from the following description and claims, and from the drawings, in which latter:

Fig. 1 is a front elevation of my improved device.

Fig. 2 is a front end elevation of the same.

Fig. 3 is a rear end elevation of the same.

Fig. 4 is a plan view of the same.

Fig. 5 is a detail sectional view taken on the line 5—5 of Fig. 1.

Fig. 6 is a central axial longitudinal section of the same, taken on the line 6—6 of Fig. 3.

Fig. 7 is a vertical cross-section of the same, taken in the plane of the line 7—7 of Fig. 6.

Fig. 8 is a horizontal cross-sectional detail view, taken in the plane of the line 8—8 of Fig. 7, showing the adjustment of the motor.

Fig. 9 is a longitudinal sectional detail view of the cutter adjustment, taken on the line 9—9 of Fig. 4.

Fig. 10 is a cross-sectional detail view of the same, taken in the plane of the irregular line 10—10 of Fig. 9; and, Fig. 11 is a cross-sectional detail view of the same, taken in the plane of the irregular line 11—11 of Fig. 9.

A housing 21 contains an electric motor 22. The shell of the electric motor is provided with feet 24. The motor is secured in place by means of bolts 25 passing through said feet. Motors of this nature are of semi-cylindrical form at their upper portions, below which the sides of the motor are usually approximately straight owing to the provision of the feet therefor. The upper portion 26 of the housing is of semi-cylindrical form, substantially parallel with the semi-cylindrical form of the upper portion of the shell of the motor therein. These substantially semi-cylindrical upper portions of the shell and housing are substantially concentric with relation to each other. The side walls 27 of the housing are substantially vertical in conformity with the substantially vertical form of the lower portion of the motor.

The upper portion of the housing is provided with an upwardly extending bearing support 28, or hump, having bearings 29, 30, thereon.

A drive-shaft 31 is journaled in these bearings, and is provided with a socket-head 32, received in a passage 33 of an upwardly diagonally extending bracket 34, extending upwardly diagonally from the bearing-support on the housing. This bracket is provided with a flange 35.

The socket of the socket-head 32 is of such form as to have the tongue end 36 of a feed-screw 37 received therein so as to rotate therewith. This socket and the tongue are shown square in cross-section for this purpose. The feed-screw is rotatable in a frame or casing 38.

The rotor-shaft 41 of the motor is provided with a drive-pulley 42, which is shown as a toothed or sprocket pinion. The shaft 31 is provided with a pulley 43, shown as a toothed or sprocket pulley. A so-called silent chain 44 is received about these pulleys for driving the shaft 31 from the motor. The pulley 43 is proximate to the inner end of the bearing 29.

The upper wall of the housing is provided with an upward extension 51, which is narrow in the direction of length of the housing, and has end walls 52, which extend crosswise of the housing. The front and rear walls 54 of the housing which extend substantially vertically upward from the side walls of the housing. A hood 55 is provided with end walls 56, in substantial line with the end walls 52, and a top wall 57, which is substantially semi-cylindrical in form, conforming substantially to the semi-cylindrical form of the upper wall of the housing, but located higher than said upper wall of the housing. This hood has a substantial semi-cylindrical extension 58, extending from the one of the end walls 56 to form a cover for the space between the pulley 43 and the bearing 30 in the bearing-support 28. The hood and cover close the upper end of the housing. The hood structure is fastened to the housing by means of bolts and nuts 59 received through lugs on the housing and on the hood-structure.

The silent chain comprises links 64 and rollers 65, the links being pivoted together on pins 66, on which the rollers rotate, the teeth of the pulleys 42, 43, being received in the spaces between said rollers.

In order to provide tautness for the flexible driving member or chain, so that the same may be suitably stretched at all times between the motor and the pulley on the shaft 31, the motor is adjustable toward and from said shaft, as by fastening the same on a platform 71. One end of the platform is pivoted on a pivot-rod 72, received through a bearing 73 at one end of said platform, and in bearings 74 on the inside face of one of the side walls of the housing. The other end of the platform is provided with an extension 75, provided with a threaded hole 76, in which an adjusting bolt 77 is threaded, the end of the adjusting bolt bearing upon a lug 78 extending inwardly from the bottom of the opposite wall of the housing. A clamp-nut 79 is arranged to clamp the bolt in adjusted position. A hold-down stud 80 is fixed in the lug 78, and passes through a slot 81 in the extension 75. An adjusting nut 82 and a clamp nut 83 are threaded about the upper end of said stud above the platform, for clamping the platform in downward position according to the adjustment of the bolt 77.

This construction provides a ready and simple means for adjusting the motor toward and from the shaft 31 and prevents a yielding of the motor to the driving strain of said flexible driving connection, which driving strain is shown as exerted in a direction away from said platform. The adjusting means are readily accessible through the door-opening for the ventilating door to be presently described.

The housing has end walls 84, 85. The end wall 84 is provided with an opening 86. A ventilating door 87 is hinged to said end wall by hinges 88 and is arranged to be closed by a latch 89. The ventilating door is provided with a protecting hood 91 which slopes downwardly and outwardly over the ventilating openings 92 in said door and has end walls 93, and is fastened to the door at its top and sides.

The end wall 85 is provided with an opening 95 which is arranged to be closed by a cap 96 secured in place as by being fastened to lugs 97 fixed to the wall of the opening. This cap is provided with ventilating openings 98 over which a downwardly and outwardly sloping hood 99 is received, the hood having end walls 100, and is secured to the cap at its top and sides.

The bracket 34 is provided with side walls and has the passage 33 therethrough. The door 87 is provided with a shelf 105 under this passage for receiving any drippings or material which may drop from or through the passage, which forms a drainage space, and be directed thereby to the container which is arranged to be placed under the delivery end of said shelf and the delivery end of said casing 38. This passage also provides ready means whereby the parts adjacent to the driving connection between the shaft 31 and the screw 37 may be cleaned.

A packing 108 is received about the socket head 32 of the shaft 31, and is located in a socket piece 109 projecting rearwardly from the casing 38. A gland 110 is arranged to compress the packing. The gland is provided with flanges 111 through which studs 112, 113, are received. The stud 112 is fixed to the casing 38, and the stud 113 is fixed in the flange 35. Adjusting nuts 114 and clamp nuts therefor adjust the gland. The casing 38 is fixed to the bracket 34 by nuts 115 received over the stud 113 and by bolts 116 at the sides of said bracket and said casing.

The periphery of the feed-screw 37 is provided with a peripheral spiral groove 121, the spirals of which approach each other closer from the feed-in end of said screw at the housing, at which the feed-hopper 122 is located, toward the feed-out end of the screw at the outer end of the casing 38. The outer end of the casing is provided with a perforated plate 123, the perforations of which may be of any desirable size, and plates having perforations of different sizes may be substituted for each other and held in place at the outer end of the casing 38, by means of a clamp collar 124, suitably releasably secured to said outer end. The perforated plate is held non-rotative by a pin 125. It is provided with a bearing 126 for steadying the outer end of the feed-shaft.

A knife structure 131 is at the outer end of the feed-screw, and rotates with the feed-screw. The knife structure is provided with a square hole 132 in which a correspondingly shaped stud 133 at the outer end of the feed-screw is received. The knife-structure is provided with knives 134 rotating across the inner end of the perforated plate 123. The material being cut is fed by said feed-screw with force against the perforated plate, being forced through the perforations, the material in the perforations being severed from the body of the material in the casing by means of the knives 134.

In order to further cut the material, for instance meat being fed from a machine, the wall of the casing is provided with knife flanges 141, which project inwardly toward the feed-screw and coact with the feed-screw in cutting and shredding the meat. The casing is also provided with knives 142 which project toward the feed-screw, and have inner cutting edges 143. These knives are adjustable toward and from the feed-screw, for placing the cutting edges of said knives at the desired distance of the feed-screw, depending on the coarseness or fineness of the desired grinding of the meat. These cutters are also preferably arranged to be removed, and are shown mounted in cutter blocks 144, in which the adjusting means for the cutters are also provided. The blocks fit the casing to prevent leakage.

These cutters are shown as extending radially with relation to the feed-screw. Each of the cutter-blocks is provided with side walls 145, between which there is a cutter-slot 146, the cutter being located in this cutter-slot. The side walls are received in a slot 147 in the casing, the slot being extended by radially extending flanges 148. The cutter-block is provided with side flanges 149, by means of which the cutter-block is secured to the walls of the slot, by means of bolts 150.

Set-bolts 151 for setting the knife inwardly are threaded in threaded holes 152 in the outer wall of the cutter-slot 146, the inner ends of said bolts being received in sockets 153 in the outer edge of the cutter. Jam nuts 154 clamp the set-bolts 151 in place.

Clamp-bolts 157 are threaded into threaded sockets 158 in the outer edge of the cutter-blade, these bolts being received through holes 159 in the outer wall of the cutter-slot 146. The clamp-bolts 157 clamp the knives outwardly against the set-bolts 151. The clamp-bolts 157 may be used for adjusting the cutter-knife outwardly with relation to the feed-screw.

The cutter-blades are readily adjustable while the cutter-block is fixed to the casing. The cutter-knives may also be readily removed by removal of the cutter-block without disturbing the adjustments of the knives for sharpening purposes or for substitution of another knife or knives. The cutter-blades may also be adjusted in the cutter-block while removed from the casing.

My improved construction permits a comparatively high speed electric motor to be employed, and permits the stepping down of the speed thereof for proper rotation of the feed-shaft by means of a single power transmission, comprising a small driving pulley on the motor and a large driven pulley on the feed-shaft.

My improved device provides an extremely compact and strong structure, in which the parts are closely associated for compact driving relation, and for feeding and grinding the material to the desired fineness.

Having thus fully described my invention, what I claim as new, and desire to secure by Letters Patent, is:

1. In a meat grinding machine of the character described, the combination of a drive-shaft frame, a feed-screw frame, a bracket connecting said frames, said bracket including a drainage space open at its top between said frames, a drive-shaft in said drive-shaft frame, a feed-screw in said feed-screw frame, a releasable driving connection between said drive-shaft and said feed-screw at said drainage space, a packing about said shaft at said drainage space, take-up means for said packing, and adjusting means in said drainage space for said take-up means.

2. In a meat grinding machine of the character described, the combination of a drive-shaft frame, a feed-screw frame, a bracket between said frames, said bracket extending from one of said frames, securing means between said bracket and the other of said frames, said bracket including a drainage space between said frames, a drive-shaft in said drive-shaft frame, a feed-screw in said feed-screw frame, a releasable driving connection between said drive-shaft and said feed-screw at said drainage space, a packing about said shaft at said drainage space, take-up means for said packing, and adjusting means in said drainage space for said take-up means, said adjusting means operable independently of said securing means.

3. In a meat grinding machine of the character described, the combination of a drive-shaft frame, a feed-screw frame, a bracket connecting said frames, said bracket including a drainage space between said frames, said drainage space open at its top and at its bottom for access thereto from outside said frames and forming a through passage from top to bottom in said bracket, a drive-shaft in said drive-shaft frame, a feed-screw in said feed-screw frame, a releasable driving connection between said drive-shaft and said feed-screw at said drainage space, a packing about said shaft at said drainage space, and adjustable take-up means for said packing.

4. In a meat grinding machine of the character described, the combination of a drive-shaft frame, a feed-screw frame, a bracket connecting said frames, said bracket including a drainage space between said frames, said drainage space open at its top and at its bottom for access thereto from outside said frames and forming a through passage from top to bottom in said bracket, a drive-shaft in said drive-shaft frame, a feed-screw in said feed-screw frame, a releasable driving connection between said drive-shaft and said feed-screw at said drainage space, a packing about said shaft at said drainage space, a gland for said packing, said gland provided with flanges in said drainage space, and adjusting means for said flanges whereby to adjust said packing.

5. In a meat grinding machine of the character described, the combination of a feed-screw, a feed-screw casing thereabout, said casing provided with slots extending lengthwise of said feed-screw, knife-blocks in said slots, knives on said knife-blocks complemental to said feed-screw, adjusting means on said knife-blocks for adjusting said knives on said blocks toward and from said feed-screw, and means for releasably securing said knife-blocks in said slots to said casing and for permitting removal of said knife-blocks with said knives thereon out of said slots and from said casing without disturbance of the adjusted relations between said knives and said knife-blocks.

6. In a meat grinding machine of the character described, the combination of a feed-screw, a feed-screw casing thereabout, said casing provided with slots extending lengthwise of said feed-screw, knife-blocks in said slots, knives on said knife-blocks complemental to said feed-screw, adjusting means on said knife-blocks for adjusting said knives on said blocks toward and from said feed-screw for cutting relations between said knives and said feed-screw, and means for releasably securing said knife-blocks in said slots to said casing always in definite relation to said casing and for permitting removal of said knife-blocks with said knives thereon out of said slots and from said casing without disturbance of the adjusted relations between said knives and said knife-blocks.

In testimony whereof, I have hereunto signed my name.

OSCAR C. SCHMIDT.